(12) United States Patent
Küster et al.

(10) Patent No.: US 8,153,929 B2
(45) Date of Patent: Apr. 10, 2012

(54) METHOD FOR THE LASER WELDING OF A COMPOSITE MATERIAL TO A COMPONENT, AND LASER-WELDABLE COMPOSITE MATERIAL FOR SUCH A METHOD

(75) Inventors: Harald Küster, Schwelm (DE); Dimitrios Peros, Siegen (DE)

(73) Assignee: Alanod Aluminium-Veredlung GmbH & Co. KG, Ennepetal (DE)

( * ) Notice: Subject to any disclaimer, the term of this patent is extended or adjusted under 35 U.S.C. 154(b) by 239 days.

(21) Appl. No.: 12/622,914

(22) Filed: Nov. 20, 2009

(65) Prior Publication Data
US 2010/0261011 A1 Oct. 14, 2010

Related U.S. Application Data

(60) Provisional application No. 61/171,536, filed on Apr. 22, 2009.

(30) Foreign Application Priority Data

Apr. 9, 2009 (DE) .................. 10 2009 016 805

(51) Int. Cl.
*B23K 26/32* (2006.01)
(52) U.S. Cl. ......... 219/121.64; 219/121.78; 219/121.85; 165/133
(58) Field of Classification Search ............ 219/121.64, 219/121.78, 121.85; 29/726; 165/133
See application file for complete search history.

(56) References Cited

U.S. PATENT DOCUMENTS
2,732,615 A 1/1956 Sandberg
(Continued)

FOREIGN PATENT DOCUMENTS
DE 3827297 A1 2/1990
(Continued)

OTHER PUBLICATIONS

Supplement to the Welding Research Journal, Apr. 1999, entitled "Modeling and Analysis of Laser Melting within a Narrow Groove Weld Joint" by J. O. Milewski and M. B. Barbe, pp. 109-s to 115-s.
(Continued)

*Primary Examiner* — Samuel M Heinrich
(74) *Attorney, Agent, or Firm* — Brinks Hofer Gilson & Lione (57) ABSTRACT

The invention relates to a method for the laser welding of a composite material (V) to a component (11) in particular for the production of a solar collector element (E), wherein the composite material (V) comprises a strip-shaped substrate (1) composed of a metal having high reflectivity to laser radiation, said substrate having a first side (A) and a second side (B), wherein a dielectric coating (7) is situated at least on the first side (A), and wherein, in order to produce a weld seam, a laser beam (L) is projected at an acute orientation angle ($\mu$) at least onto the first side (A) of the substrate (1) provided with the dielectric coating (7). In order to improve the energy efficiency of the laser radiation used, it is proposed that the dielectric coating (7) has a thickness ($D_B$) in the range of 140 nm to 210 nm and the laser beam (L) is radiated in at an orientation angle ($\mu$), in particular in focused fashion, in such a way that the radiated-in energy of the laser beam (L) is absorbed to the extent of at least 15 percent.

27 Claims, 7 Drawing Sheets

U.S. PATENT DOCUMENTS

| | | | |
|---|---|---|---|
| 3,397,440 A | 8/1968 | Dalin | |
| 3,999,029 A | 12/1976 | Orr, Jr. | |
| 4,023,005 A | 5/1977 | Bolin | |
| 4,224,499 A | 9/1980 | Jones | |
| 4,312,915 A | 1/1982 | Fan | |
| 4,362,921 A | 12/1982 | Rudd | |
| 4,634,832 A | 1/1987 | Martyr | |
| 4,732,086 A | 3/1988 | Schiestl et al. | |
| 4,737,612 A | 4/1988 | Bruck et al. | |
| 4,784,312 A | 11/1988 | Gotoh | |
| 4,912,297 A | 3/1990 | Beyer et al. | |
| 5,532,445 A | 7/1996 | Junker | |
| 5,591,359 A * | 1/1997 | Saitou et al. | 219/121.64 |
| 5,760,365 A * | 6/1998 | Milewski et al. | 219/121.64 |
| 5,841,098 A | 11/1998 | Gedrat et al. | |
| 5,859,402 A * | 1/1999 | Maier | 219/121.64 |
| 6,111,213 A | 8/2000 | Suchier | |
| 6,300,591 B1 | 10/2001 | Fuerschbach et al. | |
| 6,429,402 B1 | 8/2002 | Dixon et al. | |
| 2002/0073988 A1 | 6/2002 | Reichert et al. | |
| 2008/0086884 A1 | 4/2008 | Hultmark | |

FOREIGN PATENT DOCUMENTS

| | | |
|---|---|---|
| DE | 102007042387 A1 | 3/2007 |
| EP | 0303074 A2 | 7/1988 |
| EP | 0870570 A1 | 10/1998 |
| EP | 0794032 B1 | 9/2002 |
| EP | 1217315 B1 | 1/2005 |
| GB | 2421457 A | 6/2006 |
| WO | WO 2006/065195 A1 | 6/2006 |
| WO | WO 2006/067378 A1 | 6/2006 |

OTHER PUBLICATIONS

American Welding Society—Abstract entitled "Recommended Practices for Laser Beam Welding, Cutting and Drilling" Approved by American National Standards Institute Nov. 9, 1998—p. 38.

Sandia Report—SAND99-2956 Unlimited Release Printed Jan. 2000, entitled "Laser Assisted Arc Welding for Aluminum Alloys" by Phillip W. Fuerschbach, Abstract pp. 1-9.

Article entitled "Dünne Schichten für Die Optik" By Dr. Hugo Anders, Stuttgart 1965.

* cited by examiner

METHOD FOR THE LASER WELDING OF A COMPOSITE MATERIAL TO A COMPONENT, AND LASER-WELDABLE COMPOSITE MATERIAL FOR SUCH A METHOD

RELATED APPLICATIONS

The present patent document claims the benefit of the filing date under 35 U.S.C. §119 of Provisional U.S. Patent Application Ser. No. 61/171,536, filed Apr. 22, 2009, and under 35 U.S.C. §119 of German Patent Application No. DE 102009016805.2 filed Apr. 9, 2009 which are hereby incorporated by reference.

BACKGROUND OF THE INVENTION

The present invention relates to a method for the laser welding of a composite material to a component in particular for the production of a solar collector element, wherein the composite material comprises a strip-shaped substrate composed of a metal having high reflectivity to laser radiation, said substrate having a first side and a second side, wherein a dielectric coating is situated at least on the first side, and wherein, in order to produce a continuous weld seam or discrete weld spots, a laser beam is projected at an acute orientation angle at least onto the first side of the substrate provided with the dielectric coating.

The invention furthermore relates to a laser-weldable composite material for use in a method of this type, comprising a strip-shaped substrate composed of a metal having high reflectivity to laser radiation, said substrate having a first and a second side, wherein a dielectric coating is situated at least on the first side.

Such a method for laser welding and also laser-weldable composite material are known from the European patent EP 1 217 315 B1 and have proved to be worthwhile in practice. In this case, EP 1 217 315 B1 describes a solar collector element produced in particular on the basis of coated aluminum strip as substrate, wherein, as component, a laser-welded tube for a heat-transfer liquid is fixed thereon. In detail, EP 1 217 315 B1 describes an absorber part connected to the tube on a first side. The absorber part is composed of the composite material comprising the metallic substrate and an optically active multilayer system situated on a second side of the substrate.

As is known, on that side of the strip-shaped substrate which is to be welded and is remote from the optical multilayer system, it is possible optionally to apply, as dielectric layer, a layer which is composed of anodically oxidized or electrolytically brightened and anodically oxidized aluminum and can be produced wet-chemically. In this case, the pores of the aluminum oxide layer can be closed off to the greatest possible extent by hot-sealing in the last phase of the wet-chemical process sequence, thus resulting in a surface with long-term stability. The dielectric layer is intended to form mechanical and corrosion-inhibiting protection for the substrate. The connection between the absorber part and the tube, which is composed of copper, in particular, is realized by means of a laser welding method, in particular in an embodiment as a pulse welding method. Laser welding is a fusion welding method, that is to say that the parts to be connected are melted under the action of the laser radiation. A particular feature here is the high power density and, when using pulse welding, the heating and rapid cooling associated with the short duration of action.

If the laser welding is carried out without an additive, the crucial material-to-material bond between the two parts to be connected is composed only of the respective materials of the absorber part and of the tube, wherein, on account of the lower melting point of aluminum, drop-shaped solidified small molten balls are formed on the absorber part, said small molten balls predominantly being composed of the material of the substrate and the material of the coating situated on the side to be welded. The small molten balls bring about the bridging of any gap or air cushion that may be present between the absorber part and the tube.

In particular, the tube and the absorber part can in this case be connected along their abutment joint by means of weld seams which run on both sides of the tube and are formed from weld spots that are spaced apart from one another and are in particular arranged regularly. In order to produce these weld seams, the laser beam is directed into the interstice formed between the tube wall and the surface of the absorber part, the focus lying on the absorber part. In this case, the distance between the focus on the absorber part and the point of contact of the tube on the absorber part is chosen such that the welding post point to be built up from the material of the absorber part can overcome the distance to the tube surface without a hole arising in the absorber part. The laser beam for the production of the weld seam has to be at an acute orientation angle with respect to the surface of the absorber part.

Laser welding with angle relationships of this type is also known from U.S. Pat. No. 6,300,591 B1. That document describes a laser welding process used to connect a planar metallic—but in contrast to EP 1 217 315 B1 uncoated—surface to a cylindrical metallic surface, in particular to that of a tube. For the acute contact angle of the tube wall relative to the planar surface, the latter preferably—as also in EP 1 217 315 B1 —being formed on an absorber part, a value resulting on account of the geometry of the tube, in particular a value resulting in a manner dependent on the diameter-dictated curvature of said tube, for the contact angle and, associated therewith, also for the orientation angle of the laser beam of in each case less than approximately 45° is mentioned as particularly preferred in said document. It is explained that in the case of such angle values, a wedge is naturally formed, which purportedly brings about a focusing of the radiation and hence a maximum energy input into the welding location, though that is not localized. The focusing is purportedly effected as a so-called "non-image concentration", that is to say without image-generating means, such as lenses, only on the basis of multiple reflection of the radiation at the wedge walls. For this purpose, the laser beam has to be applied to the planar surface and the cylindrical surface simultaneously, and the bodies to be welded, according to the document, have to have a high reflectivity. In particular, copper and aluminum and alloys thereof are claimed as suitable materials in this regard.

According to U.S. Pat. No. 6,300,591 B1, the phenomenon of radiation concentration is purportedly based on the so-called Mendenhall wedge effect, which was described in 1911 by Charles Elwood Mendenhall (1872-1935)—Mendenhall, C. E.: "On the emissive power of wedge shaped cavities and their use in temperature measurements", The Astrophysical Journal 33 (2), pp. 91-97.

However, in the case of a convex surface as described for one of the components to be welded in U.S. Pat. No. 6,300, 591 B1, it should be assumed that a divergent beam bundle will arise from a laser beam with light directed in a parallel manner. Moreover, since a high temperature is intended to be generated for welding by the laser beam at the welding location, the use of highly reflective surfaces proves to be counterproductive with regard to the energy input brought about by the laser beam. When different materials are used, it is predominantly the material having the lower melting point that melts in the case of low conductivity. Furthermore, the Mendenhall effect, which is based on multiple reflections, results in an energy input distributed over the reflection locations. Since the proportion of the absorbed energy—assuming transmission of the beam through the material of zero—results from the difference between one and the reflected energy proportion of the beam, the absorbed energy density is significantly lower than when the laser beam is focused by means of a lens. Therefore, it cannot be recognized how a stable weld with good heat transfer is supposed to arise in accordance with U.S. Pat. No. 6,300,591 B1.

Such an orientation of the laser beam requires a very precise and therefore complex alignment and cannot be realized particularly when a plurality of closely adjacent cylindrical components having a relatively large diameter are intended to be welded to the planar component. U.S. Pat. No. 5,760,365 is also concerned with the abovementioned lensless concentration of the laser radiation in a wedge-shaped narrow gap. In said document, metals having a reflectivity to the laser radiation of more than 90 percent are cited as highly reflective metals that should necessarily be used.

DE 38 27 297 A1 also relates to improving the efficiency of the inputting of the energy when joining workpieces by means of laser radiation. Said document relates to an apparatus serving for the laser welding of workpieces, wherein, as in the two patent specifications cited in the introduction, at least one of the workpieces is preferably convexly bent in the manner of a tube at the joining location. In that case, the laser radiation is radiated in a manner directed substantially parallel to a joining gap plane and substantially perpendicular to a joining line and is predominantly polarized in a single plane. In order that the available radiation power can be utilized more efficiently for joining the workpieces, namely in a manner coordinated with the materials thereof, a laser radiation that is polarized perpendicular to the joining gap plane is used. For the predetermined joining geometry, this leads to an optimum energy absorption, namely with grazing incidence of the laser radiation into the joining gap between the workpiece surfaces facing one another. In one configuration of the technical solution described, the laser beam is at least predominantly directed onto only one of the workpieces to be joined. Accordingly, the energy transported by the laser beam, with application of the laser radiation polarized perpendicular to the gap plane, is also coupled into only one of the two workpieces, namely preferably into the one which has the higher melting point and therefore requires more energy for melting. By way of example, materials mentioned include aluminum having a melting point of 600° C. and steel having a melting point of 1600° C. Coatings are not provided. By means of the known apparatus and the corresponding method, the joining of workpieces composed of different materials is thus facilitated, but this presupposes a polarized laser radiation. In order to form the laser beam in striped fashion, optical lenses and/or mirrors are used.

U.S. Pat. No. 4,023,005, which is likewise concerned with the laser welding of components composed of materials that are highly reflective to laser radiation, provides for covering said components with a cladding of low reflectivity metals having a thickness of at least 12.5 μm (0.0005 inch). In particular, nickel layers on copper and also palladium layers on silver or gold are mentioned therein. The metallic coating materials mentioned are in part expensive or the coating process also in part constitutes an increased outlay.

BRIEF SUMMARY OF THE INVENTION

The present invention is based on the object of providing a method of the type described in the introduction for the laser welding of a composite material to a component and also a laser-weldable composite material of the type described in the introduction that is suitable for this method, wherein an increased efficiency of the welding process is intended to be achieved in conjunction with high functionality and in conjunction with producibility of the composite material involving the least possible outlay.

This is achieved according to the invention for the method by virtue of the fact that the dielectric coating has a thickness in the range of 140 nm to 210 nm and the laser beam is radiated in onto the composite material in such a way that the radiated-in energy of the laser beam is absorbed to the extent of at least 15 percent. In this case, the laser beam can be focused in particular optically, for example by means of lenses. An orientation angle at which the laser beam is radiated in can preferably lie in the range of 2° to 50°.

This is correspondingly achieved according to the invention for the composite material by virtue of the fact that the dielectric coating has a thickness in the range of 140 nm to 210 nm in such a way that the energy of a laser beam is absorbed to the extent of at least 15 percent. In this case, the laser beam can preferably be radiated in at an orientation angle dependent on the tube diameter and the composite material thickness, wherein said angle can preferably lie in the range of 2° to 50°. In this case, the laser beam can be focused in particular optically.

In general, in the case of an object on which a radiation impinges—as occurs in the case of the coated surface of an absorber part—said radiation is split into a reflected portion, an absorbed portion and a transmitted portion, which are determined by the reflectivity (reflectance), the absorptivity (absorptance) and the transmissivity (transmittance) of the object. While dielectric layers which together with a metallic substrate form a composite material do not necessarily have a significant influence on the reflectivity and the absorptivity of the material, the invention is based on the surprising insight that in the case of the configuration according to the invention of the composite material and of the method, the energy absorption of a laser beam can be increased to a multiple by comparison with an uncoated substrate surface or else a substrate surface not coated according to the invention.

By way of example, the energy absorption of a laser light having a wavelength of 1064 nm that is projected onto an uncoated aluminum substrate is approximately 10 percent given orientation angles of the laser beam in the range of 20° to 30°. The same likewise applies to an aluminum substrate having a native aluminum oxide layer having a thickness of approximately 3 nm, and also to an aluminum substrate to which a technical aluminum oxide layer of approximately 100 nm or else 250 nm was applied. If, however, according to the invention, a 190 nm thick aluminum oxide layer is applied to the substrate as a dielectric coating, for example, then the absorptivity in the same angular range can advantageously be increased to at least approximately double the value.

Further advantageous embodiments of the invention are contained in the dependent claims and in the detailed description below.

BRIEF DESCRIPTION OF THE DRAWINGS

The invention is explained in greater detail on the basis of an exemplary embodiment illustrated by the accompanying drawing, in which.

In the various figures of the drawing, the same parts are also always provided with the same reference symbols and are therefore generally also described only once in each case.

DETAILED DESCRIPTION OF THE INVENTION

Figure 1:
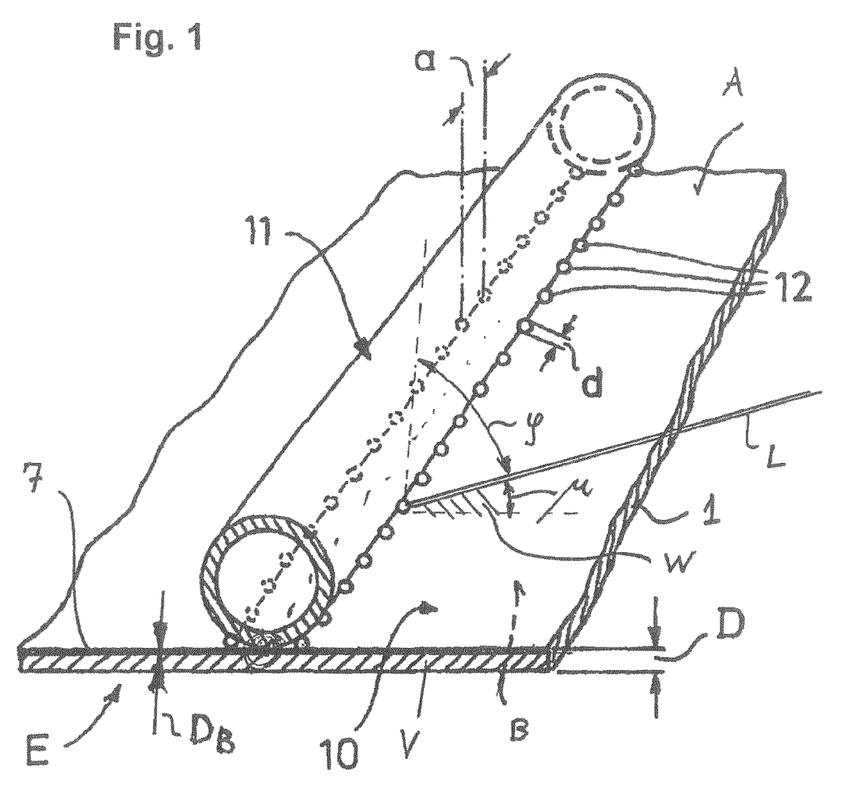
FIG. 1 shows a perspective sectional illustration of a solar collector element that can be produced by means of the method according to the invention and with the composite material according to the invention.
Figure 2:
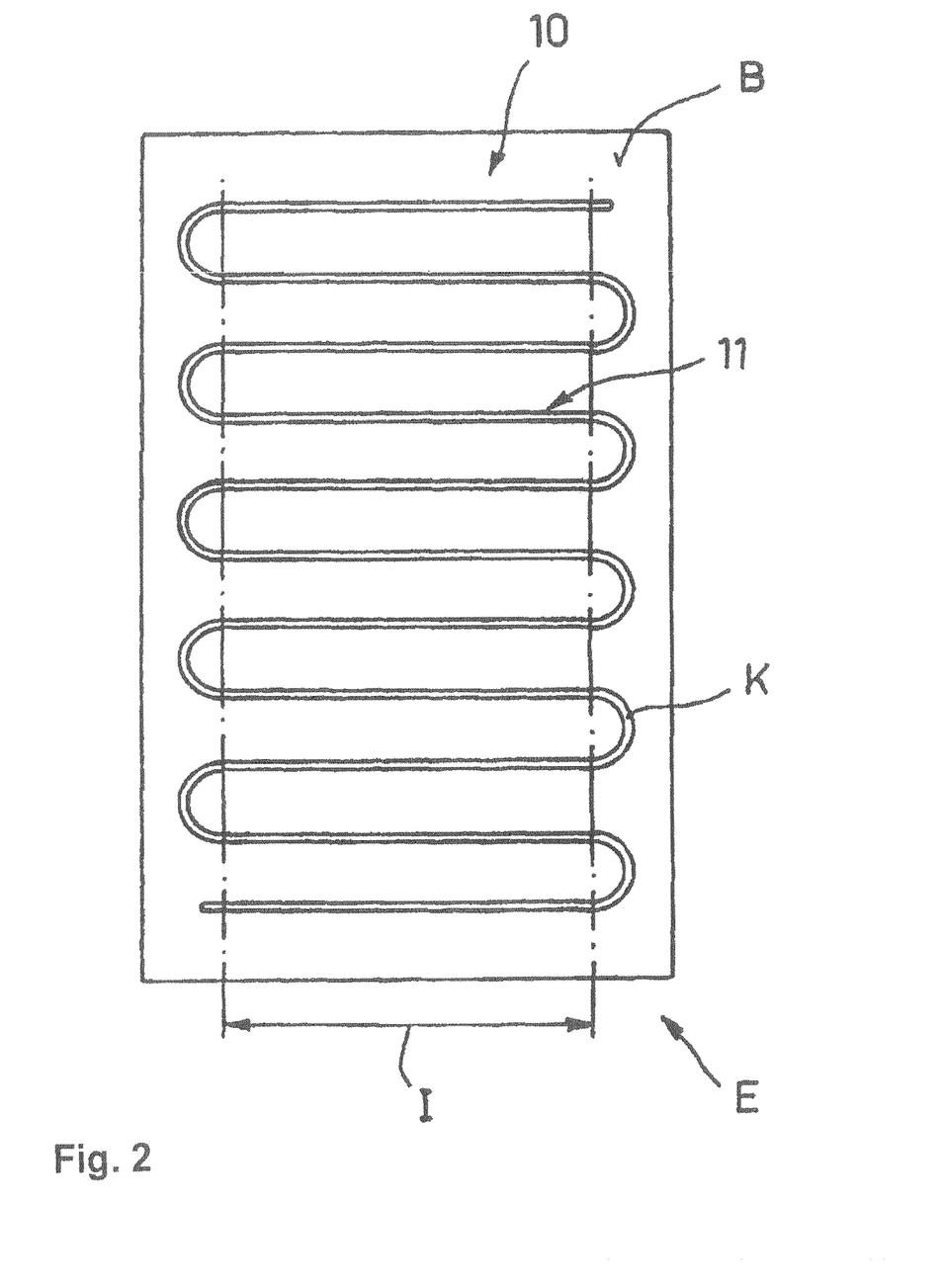
FIG. 2 shows a plan view of an embodiment of a solar collector element illustrated in FIG. 1 with a meandering tube path.

FIGS. 1 and 2 illustrate the overall construction of a solar collector element E that can be produced according to the method according to the invention and with the composite material V according to the invention. From the solar collector element E, the drawing in accordance with FIG. 1 schematically illustrates an absorber part 10 and a tube 11 for a heat-transfer liquid—as an example of a component to be welded to the composite material V according to the invention.

Figure 6:
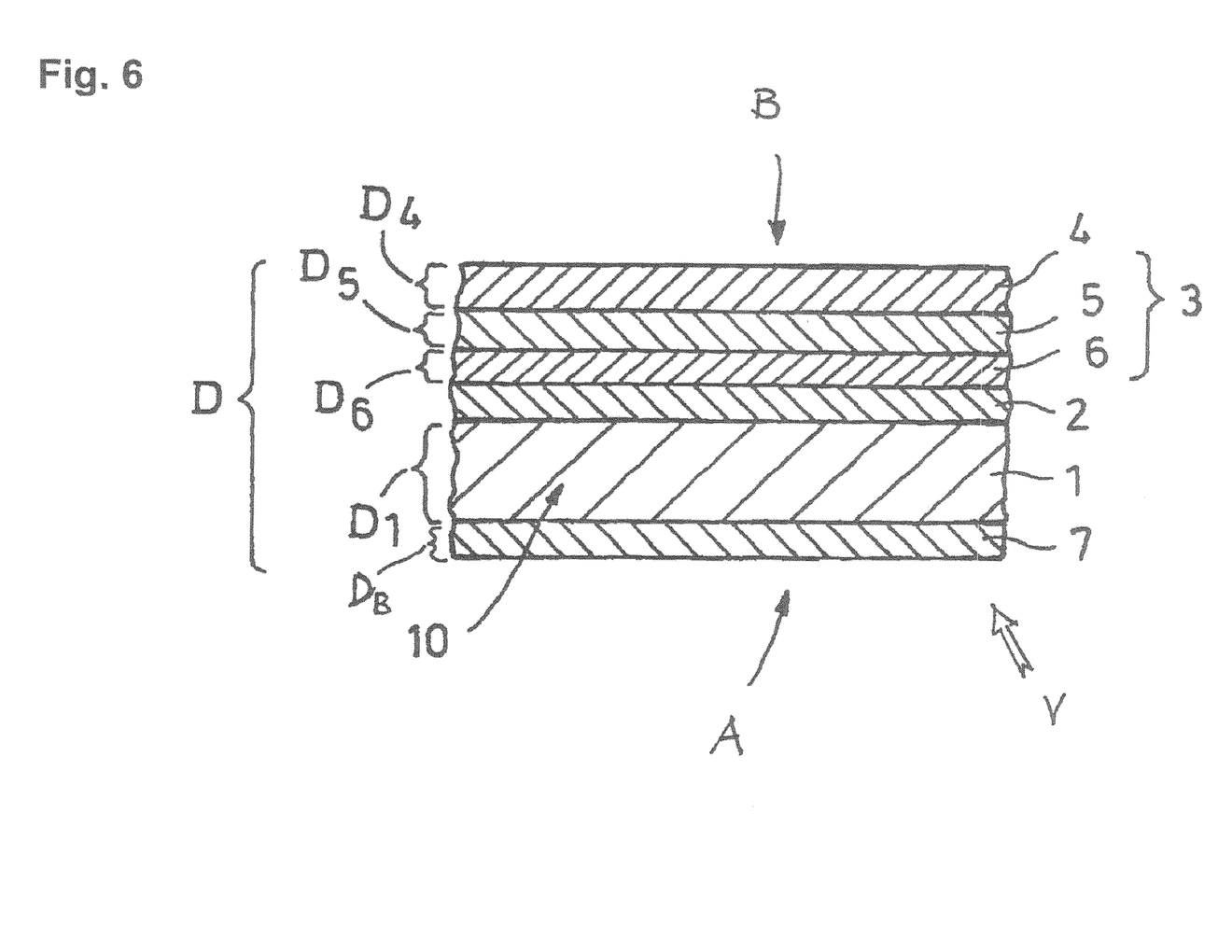
FIG. 6 shows an embodiment of the composite material according to the invention in cross section, this embodiment being preferred for the production of a solar collector element.

The absorber part 10 is composed of the composite material V according to the invention, having a substrate 1 composed of aluminum—as an example of a metal having high reflectivity to laser radiation. The substrate 1 has a first side A and a second side B. On the substrate 1, a multilayer system 3 comprising three layers 4, 5, 6 is situated above an interlayer 2 on the second side B—as shown in FIG. 6—, which multilayer system will be explained in even greater detail below. A dielectric coating 7 is situated on the first side A of the substrate 1.

With aluminum strip as substrate 1, there are a multiplicity of different rolled surfaces available, in particular surfaces with a grooved structure, which, when used as absorber composite material, can advantageously minimize and homogenize the extent to which the absorptance is dependent on the angle of the sun, given a suitable orientation.

The absorber part 10, which can be produced in an environmentally friendly and cost-effective manner, results in high light absorption and dissipation of heat to the tube 11, while a comparatively long service life can be ensured under the operating conditions of a collector involving high thermal loads. The nature of the connection between the absorber part 10 and the tube 11, which is composed of copper, in particular, which is realized by means of the laser welding method according to the invention, in particular in an embodiment as a pulse welding method, also contributes to the latter effect.

Laser welding is a fusion welding method, that is to say that the parts to be connected are melted under the action of a laser beam L which in particular is focused. An Nd:YAG laser, for example, can be used to generate the laser beam L. In this case, the laser beam L is projected at an acute orientation angle $\mu$ with respect to the surface of the substrate 1 at least onto the first side A of the substrate 1 provided with the dielectric coating 7. A second incident angle $\phi$ complementary to 90° is thereby formed between the focused laser beam L and the perpendicular—as illustrated in FIG. 1. Projection onto the component (tube 11) is not necessary.

In particular, the tube 11 and the absorber part 10—as illustrated—can be connected along their abutment joint by means of weld seams which run on both sides of the tube 11 and which are characterized by weld spots that are spaced apart at a distance a from one another and are arranged in particular regularly and are formed from small molten balls 12.

The small molten balls 12 bring about the bridging of any gap or air cushion which may be present between the absorber part 10 and the tube 11. In order that an optimum connection arises, the power density of the laser during welding should not exceed $10^7$ W/cm², preferably $10^6$ W/cm². The total energy for a weld spot should act over a time period of up to approximately 10 ms, preferably subdivided temporally. In this case, the actual spatial and temporal intensity distribution of the laser radiation at the location of action, in particular the possible occurrence of so-called "spiking" or so-called "hot spots", should also be taken into account.

It has been discovered that during operation of a solar collector, the heat transfer from the absorber part 10 to the tube 11 takes place predominantly at the weld spots, the size of the small molten balls 12 and the distance a between the small molten balls 12 are the crucial factors in determining the efficiency of the collector. On the other hand, the thermal resistance of the absorber part 10 in the plane of extent thereof has a limiting effect on the efficiency of the collector. In this case, said thermal resistance of the absorber part 10 is determined substantially by the thermal conductivity of the composite material V according to the invention, primarily that of the substrate 1, and secondly by a thickness D of the absorber part 10 or of the composite material V.

It has therefore also been discovered that the optimum distance a between the small molten balls 12, for a predetermined composite material of the absorber part 10 and a fixed size (diameter d) of the small molten balls 12, therefore depends on the thickness D of the absorber part. In the case of a substrate 1 composed of aluminum, a thickness D of the absorber part 10 of approximately 0.3 to 0.8 mm, and a diameter D of the small molten balls 12 of approximately 0.2 to 3.2 mm, said optimum distance a (distance between the centers of the small molten balls 12) is approximately 0.5 to 2.5 mm. The greater the thickness D of the absorber part 10, the shorter the distance a between the weld spots has to be chosen.

The tube 11 can be laid in particular in straight fashion or, as illustrated in FIG. 2, in meandering fashion on the absorber part 10. In the case where said tube is laid in meandering fashion, the welding can be restricted to straight tube regions I, while curved tube regions K are not welded. The method according to the invention can also be used optimally in the case of tubes 11 having a larger diameter or closely adjacent tubes 11, because the laser beam L can be used at an orientation angle $\mu$ of up to 50°.

The composite material V can preferably be processed in the form of a coil having a width of up to 1600 mm, preferably of 1250 mm, and having a thickness D of approximately 0.1 to 1.5 mm, preferably of approximately 0.2 to 0.8 mm, wherein the solar collector element E according to the invention can be produced therefrom in a simple manner by stamping out a plate-type absorber part 10 and connecting it to the tube 11. In this case, the substrate 1 of the composite material V can preferably have a thickness $D_1$ of approximately 0.1 to 0.7 mm.

The aluminum of the substrate 1 can have, in particular, a purity higher than 99.0%, which promotes a high thermal conductivity.

For the coating 7 of the composite material V, the invention provides for said coating to have a thickness $D_B$ in the range of 140 nm to 210 nm in such a way that the energy of the focused laser beam L, if the latter is radiated in at an orientation angle μ in the range of 2° to 50°, is absorbed to the extent of at least 15 percent. In accordance with the method according to the invention, the laser beam L is actually radiated in at such an orientation angle μ. The complementary incident angle φ therefore lies between 88° and 40°.

It is preferred, in order to obtain a high absorptivity of the laser radiation, for the coating 7 to have a thickness $D_B$ in the range of 170 nm to 195 nm.

The coating 7 can be substantially composed of aluminum oxide, in which case, for the purpose of a production procedure involving little technological complexity, if the substrate 1 of the composite material V according to the invention is composed of aluminum, aluminum oxide formed from the anodically oxidized or electrolytically brightened and anodically oxidized aluminum of the substrate 1 can be involved.

Since the laser welding of the absorber part 10 to the tube 11 is preferably carried out without an additive, the material-to-material bond that arises between the two parts to be connected is composed only of the respective materials of the absorber part 10 and of the tube 11. In this case, on account of the lower melting point of aluminum and because the focused laser beam L, according to the invention, is also preferably directed only onto the absorber part 10 and not onto the tube 11, the small molten balls 12 are predominantly composed of an aluminum matrix into which aluminum oxide particles are incorporated. A compound having particularly high strength is obtained as a result. In principle, it is possible for the copper of the tube 11 to have diffused into the aluminum and, in particular, for the aluminum of the substrate 1 to have diffused into the copper of the tube 11. In this case, however, the formation of brittle intermetallic phases composed of copper and aluminum is counteracted by the presence of the aluminum oxide. This is a further advantage of this embodiment of the invention.

Figure 3:
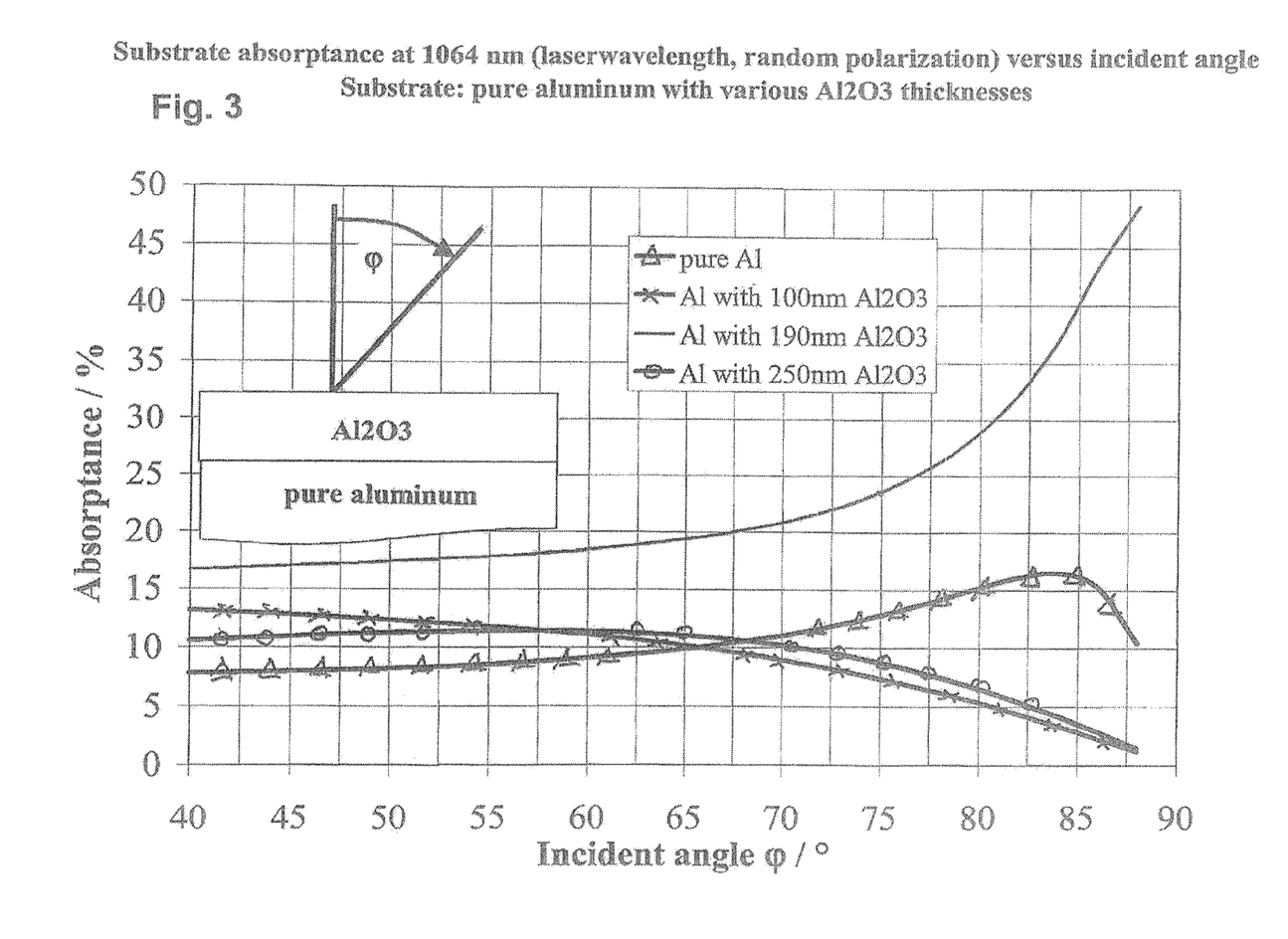
FIG. 3 shows, in comparison with materials that are not according to the invention, a graphical illustration of the absorptance of an embodiment of the composite material according to the invention as a function of an incident angle of a laser beam used in a method according to the invention.
Figure 4:
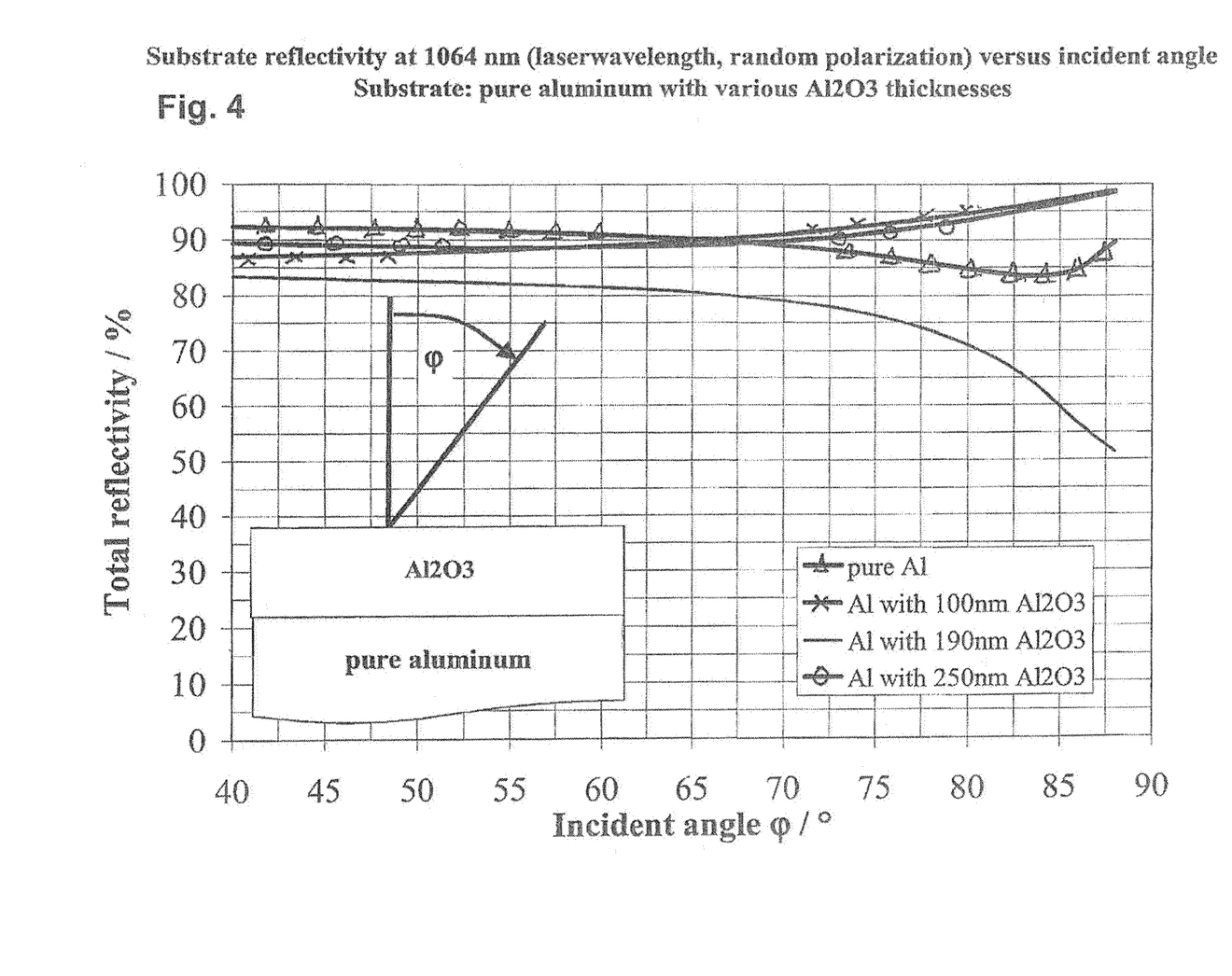
FIG. 4 shows, in comparison with materials that are not according to the invention, a graphical illustration of the reflectance of the embodiment of the composite material according to the invention in accordance with FIG. 3 as a function of the incident angle of the laser beam used in a method according to the invention.
Figure 5:
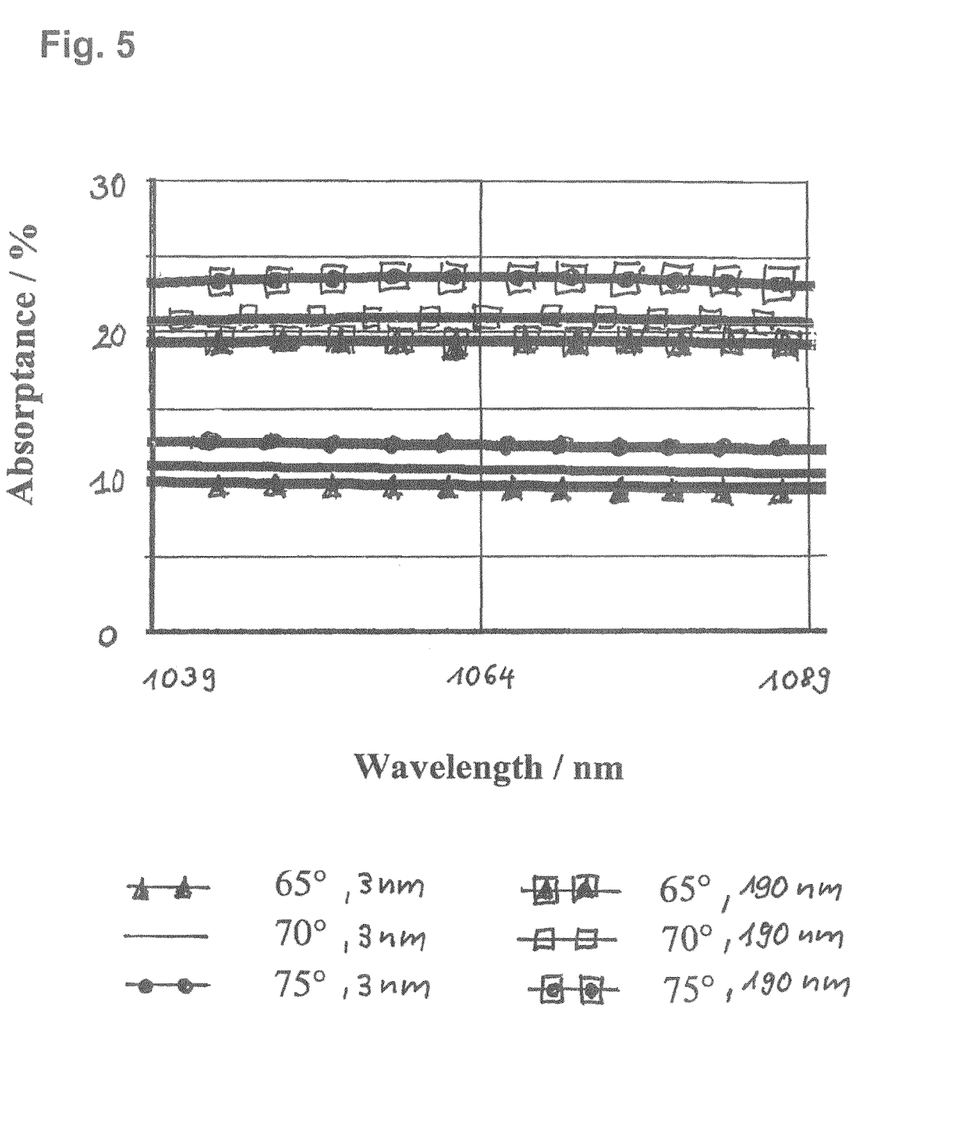
FIG. 5 shows, in comparison with materials that are not according to the invention, a graphical illustration of the absorptance of the embodiment of the composite material according to the invention in accordance with FIGS. 3 and 4 as a function of the wavelength of the light of the laser beam used in the method according to the invention.

As already mentioned, FIGS. 3 and 4 illustrate the absorptance and the reflectance (total reflectivity) of an embodiment of the composite material V according to the invention in comparison with the values of the materials that are not according to the invention. The curves relate to a laser wavelength of 1064 nm, as is characteristic of an Nd:YAG laser. The polarization of the laser beam L was randomly distributed. The standard DIN 5036, part 3 is obligatory for the determinations of absorptance and reflectance. The composite material V according to the invention, to which reference is made in FIGS. 3 and 4 and also in FIG. 5, is a composite material in which the dielectric coating 7 has a thickness $D_B$ of 190 nm. The materials that are not according to the invention, in FIGS. 3 and 4, are on the one hand a substrate 1 without a coating (pure aluminum) and, on the other hand, composite materials in which the dielectric coating 7 has a thickness $D_B$ of 100 nm in one instance and a thickness $D_B$ of 250 nm in one instance. The graphical illustrations in each case illustrate the dependence of the abovementioned optical properties on the incident angle φ of the employed laser beam L in the range of 40° to almost 90°. Since the transmission through the composite material is equal to zero, the respective curve profiles in FIGS. 3 and 4 are complementary to one another, that is to say that for a specific angle value φ, the sum of the absorptance in FIG. 3 and the reflectance in FIG. 4 always yields 100 percent.

Firstly, the graphics illustrate that the aluminum substrate 1 is a highly reflective material. The reflection values lie approximately constantly above 85 percent almost in the entire angular range. Only for an incident angle φ of approximately 83° is there a slightly formed minimum of approximately 82 percent. The situation is likewise similar with the curves of the composite materials in which the dielectric coating 7 has a thickness $D_B$ of 100 nm in one instance and a thickness $D_B$ of 250 nm in one instance. In the case of these materials, the reflectivity in an angular range above 70° even rises above that of pure aluminum. The absorptance decreases to values of approximately 1 percent at an incident angle φ of approximately 87°.

In the entire angular range, the absorptance of the composite material V according to the invention, in which the dielectric coating 7 has a thickness $D_B$ of 190 nm, lies, in part multiply, above the values of the materials that are not according to the invention, and the reflectivity correspondingly lies below the values of said materials that are not according to the invention.

In the comparison—reproduced in FIG. 5—of the absorptance of a composite material V according to the invention with a material that is not according to the invention, the graphical illustration of the embodiment according to the invention once again relates to an embodiment in which the dielectric coating 7 has a thickness $D_B$ of 190 nm. The material that is not according to the invention is one in which a native oxide layer having a thickness of approximately 3 nm is formed on the aluminum surface of the substrate 1. FIG. 5 illustrates the absorptance as a function of the wavelength of the laser beam L in the range of 1039 nm to 1089 nm for in each case three different incident angles φ (65°, 70°, 75°). The curve profile is approximately constant in each case. This also holds true in the case of an extrapolation (not illustrated) downward to approximately 960 nm and a corresponding extrapolation upward to approximately 1170 nm. It becomes clear that, according to the invention, values of the absorptance are achieved which are approximately twice as high as in the case of a material having a native aluminum oxide layer. For the efficiency of the energy utilization of the laser beam L, this means an increase in the efficiency by 100 percent.

In connection with the graphical illustrations in FIGS. 3 to 5, the following can also be established with regard to the invention: it can particularly preferably be provided that the dielectric coating 7 has a thickness $D_B$ of less than 200 nm and the laser beam L is radiated in at an orientation angle μ in the range of 2° to 22° in such a way that the radiated-in energy of the laser beam L is absorbed to the extent of at least 20 percent, preferably to the extent of at least 30 percent. Extremely high absorption values are possible if the laser beam L is radiated in at an orientation angle μ in the range of 7° to 17°.

It had already been mentioned that a multilayer system 3 comprising three layers 4, 5 6 can preferably be situated above an interlayer 2 on the second side B on the substrate 1, as is illustrated in FIG. 6. The interlayer 2 situated on the second side B of the substrate 1 can advantageously likewise be a dielectric coating 2, in particular in a technologically advantageous manner a coating 2 produced identically to the dielectric coating 7 situated on the first side A of the substrate 1.

Thus, both layers 2, 7 can be produced for example simultaneously by means of a so-called ANOX method, that is to say anodic oxidation or electrolytic brightening with subsequent anodic oxidation of the aluminum of the substrate 1. This involves a wet-chemical method, wherein the pores of the aluminum oxide layers can be closed off to the greatest possible extent by hot-sealing in the last phase of the wet-chemical process sequence, thus resulting in a surface with long-term stability. Therefore—like the interlayer 2 as well—the layer 7 on the first side A of the substrate 1 also affords mechanical and corrosion-inhibiting protection for the substrate 1. As an alternative, production of the dielectric layers 2, 7 as sputtering layers would also be possible.

Of the three individual layers 4, 5, 6 of the optically active multilayer system 3, the two upper layers 4, 5 can be oxidic layers and the bottommost layer 6 can be a metallic layer applied to the interlayer 2. The topmost layer 4 of the optical multilayer system 3 can be, in particular, a silicon-oxidic layer having the chemical composition $SiO_y$. The middle layer 5 can be a layer containing chromium oxide and having the chemical composition $CrO_x$, and the bottommost layer 6 is preferably composed of gold, silver, copper, chromium, aluminum and/or molybdenum.

In this case, the indices x, y denote a stoichiometric or non-stoichiometric ratio of the oxygen in the oxides to the oxidized substance. This stoichiometric or non-stoichiometric ratio x can preferably lie in the range $0<x<3$, while the stoichiometric or non-stoichiometric ratio y can assume values in the range $1 \leq y \leq 2$.

The fact that the two upper layers 4, 5 of the optical multilayer system 3 can be sputtering layers, in particular layers produced by reactive sputtering, CVD or PECVD layers or layers produced by vaporization, in particular by electron bombardment or from thermal sources, means that it is possible to set the ratios x, y continuously (that is to say also to non-stoichiometric values of the indices), with the result that the respective layer properties can be varied.

In this case, the topmost layer 4 of the optical multilayer system 3 can advantageously have a thickness $D_4$ of more than 3 nm. At this thickness $D_4$, the layer already has a sufficient efficiency, yet the outlay on time, material and energy assumes only low values. An upper limit value of the layer thickness $D_4$, from this standpoint, is approximately 500 nm. An optimum value for the middle layer 5 of the optical multilayer system 3 from the standpoints mentioned is a minimum thickness $D_5$ of more than 10 nm, maximally approximately 1 μm. The corresponding value for the bottommost layer 6 is a thickness $D_6$ of at least 3 nm, maximally approximately 500 nm.

With a view to achieving a high efficiency, the bottommost layer 6 of the optical multilayer system 3 should preferably have a purity higher than 99.5%. As already mentioned, the layer can be a sputtering layer or a layer produced by vaporization, in particular by electron bombardment or from thermal sources, such that the entire optical multilayer system 3 advantageously comprises layers 4, 5, 6 that are applied in vacuum sequence in a continuous method.

The bottommost layer 6 of the optical multilayer system 3 can comprise a plurality of partial layers that are composed of gold, silver, copper, chromium, aluminum and/or molybdenum and are arranged one above another. A construction from partial layers is also possible for the topmost layer 4 and the middle layer 5.

According to the invention, it is possible, in particular, to configure the layer construction in such a way that a total light reflectivity—determined in accordance with DIN 5036, part 3—of the optical multilayer system 3 on the second side B of the substrate 1 is preferably less than 5%.

Figure 7:
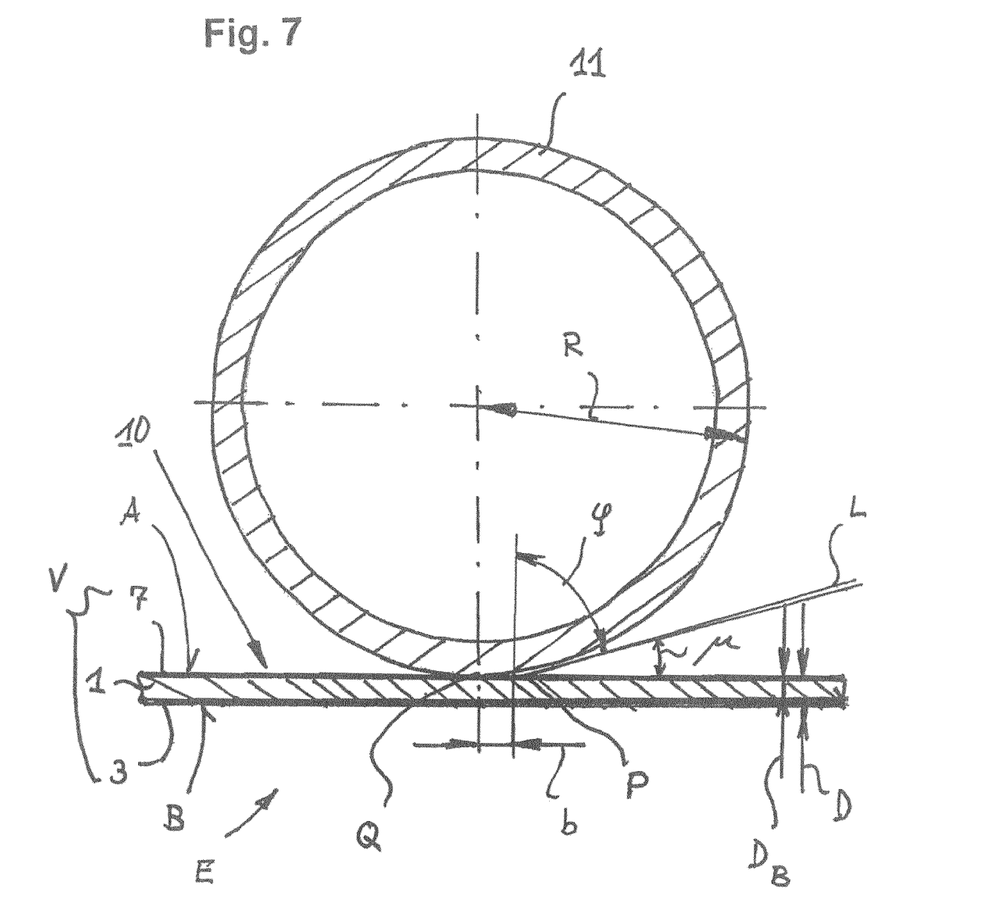
FIG. 7 shows a further sectional illustration of a solar collector element that can be produced by means of the method according to the invention and with the composite material according to the invention.

The further sectional illustration—shown in FIG. 7—of a solar collector element E that can be produced by means of the method according to the invention and with the composite material V according to the invention illustrates further preferred details of the method according to the invention. In the method, the laser beam L is preferably aimed onto the material having the lower melting point, that is to say onto the composite material V, in particular, in the case illustrated. In this case, an impingement point P of the laser beam L is at a distance b away from a tangent point Q at which the absorber part 10, in particular the dielectric coating 7 of the composite material V, touches the tube 11. The impingement point P is chosen in such a way that enough composite material V from the absorber part 10 can be melted to form the small molten balls 12. As a result of the action of the laser beam L, said small molten balls 12 grow upward in pillar-like fashion from the absorber part 10 and, as a result of this growth in the direction of the tube 11, bridge a distance existing between the impingement point P and the wall of the tube 11. The welding connection is produced in the process. An optimum distance b between the impingement point P of the laser beam L and the tangent point Q is present in this case if the distance b is not greater than 10 percent of a radius R of the tube 11. By way of example, given a radius R of the tube 11 of 5 mm, the distance b should not be greater than 0.5 mm.

The present invention is not restricted to the exemplary embodiment illustrated, but rather encompasses all means and measures which achieve the same effect within the context of the invention. It is thus also possible, for example, to produce the dielectric coating 7 from a different material than aluminum oxide.

Furthermore, the person skilled in the art can supplement the invention by means of additional advantageous measures without departing from the scope of the invention. Thus, the absorptivity at the welding location can additionally be improved by a further 4 to 8 percent if the laser beam L is not polarized stochastically, but rather in a single plane linearly with a so-called p-polarization. In this case, the incident and the reflective beam L define an incidence plane that is perpendicular to the interface between composite material V and component 11. Said incidence plane is designated by the reference symbol W in FIG. 1. Light having a plane of polarization lying perpendicular to the incidence plane W is called s-polarized light, and light having a plane of polarization lying parallel to the incidence plane W is called p-polarized light.

Furthermore, the invention is not restricted to the combination of features defined in the claims, but rather can also be defined by any other desired combination of specific features of all the individual features disclosed overall. This means that in principle virtually any individual feature of the claims can be omitted or replaced by at least one individual feature disclosed elsewhere in the application. In this respect, the claims should be understood merely as an initial attempt at putting an invention into words.

The invention claimed is:

1. A method for the laser welding of a composite material (V) to a component (11) for the production of a solar collector element (E), the method comprising the steps of:

providing the composite material (V) comprising a strip-shaped substrate (1) composed of a metal having high reflectivity to laser radiation, said substrate having a first side (A) and a second side (B), wherein a dielectric coating (7) is situated at least on the first side (A), the dielectric coating (7) having a thickness ($D_B$) in the range of 140 nm to 210 nm; and projecting a laser beam (L) at an acute orientation angle (μ) at least onto the first side (A) of the substrate (1) provided with the dielectric coating (7), in order to produce one of a continuous weld seam and discrete weld spots, wherein the laser beam (L) is radiated in onto the composite material (V) in such a way that the radiated-in energy of the laser beam (L) is absorbed to the extent of at least 15 percent.

2. The method according to claim 1, characterized in that the laser beam (L) is focused optically, for example by means of lenses.

3. The method according to claim 2, characterized in that the laser beam (L) is focused by lenses.

4. The method according to claim 1, characterized in that the coating (7) is a ceramic coating.

5. The method according to claim 1, characterized in that the coating (7) has a thickness ($D_B$) in the range of 170 nm to 195 nm.

6. The method according to claim 1, characterized in that the coating (7) has a thickness ($D_B$) of less than 200 nm and the laser beam (L) is radiated in onto the composite material (V), in particular at an orientation angle (μ) in the range of 2° to 50°, in such a way that the radiated-in energy of the laser beam (L) is absorbed to the extent of at least 20 percent.

7. The method according to claim 1, characterized in that the laser beam (L) is radiated in onto the composite material (V) at an orientation angle (μ) in the range of 2° to 50°.

8. The method according to claim 7, characterized in that the orientation angle (μ) at which the laser beam (L) is radiated in onto the composite material (V) is less than 30°.

9. The method according to claim 7, characterized in that the focused laser beam (L) is radiated in onto the composite material (V) at an orientation angle (μ) in the range of 7° to 17°.

10. The method according to claim 1, characterized in that the laser beam (L) is linearly polarized in a single plane.

11. The method according to claim 10, characterized in that the laser beam (L) is polarized in such a way that its light lies parallel to an incidence plane (W) perpendicular to the interface between composite material (V) and component (11).

12. The method according to claim 1, characterized in that the coating (7) is substantially composed of aluminum oxide.

13. The method according to claim 1, characterized in that the substrate (1) of the composite material (V) is composed of aluminum.

14. The method according to claim 12, characterized in that the aluminum oxide of the coating (7) is formed from one of anodically oxidized, and electrolytically brightened and anodically oxidized, aluminum of which the substrate (1) is composed.

15. The method according to claim 1, characterized in that the component (11) is a tube (11).

16. The method according to claim 1, characterized in that the component (11) is composed of copper.

17. The method according to claim 1, characterized in that the component (11) and the composite material (V) are connected along an abutment joint of the component (11) and of the composite material (V) by means of weld seams running on both sides of the component (11).

18. The method according to claim 1, characterized in that each weld seam is formed from small molten balls (12) that are spaced apart from one another (distance a).

19. The method according to claim 18, characterized in that the energy of the laser beam (L) for producing a small molten ball (12) acts over a time period of not more than approximately 10 ms.

20. The method according to claim 1, characterized in that the power density of the laser beam (L) during welding does not exceed $10^6$ W/cm$^2$.

21. The method according to claim 1, characterized in that an Nd:YAG laser is used for producing the laser beam (L).

22. The method according to claim 1, characterized in that a dielectric coating (2) is situated on the second side (B) of the substrate (1).

23. The method according to claim 22, characterized in that the coating (2) on the second side (B) of the substrate (1) is produced identically to the coating (7) situated on the first side (A) of the substrate (1).

24. The method according to claim 1, characterized in that an optically active coating (3) is situated on the second side (B) of the substrate (1).

25. The method according to claim 24, characterized in that the optically active coating (3) is a multilayer system (3) composed of at least three layers (4, 5, 6).

26. The method according to claim 25, characterized in that, in the multilayer system (3), a topmost layer (4) is a dielectric layer, a middle layer (5) is a layer containing chromium oxide, and in that a bottommost layer (6) is composed of gold, silver, copper, chromium, aluminum and/or molybdenum.

27. The method according to claim 1, characterized in that a distance (b) between an impingement point (P) of the laser beam (L) and a tangent point (Q), at which the coating (7) of the composite material (V) touches the component (11), embodied as a tube (11), is not greater than 10 percent of a radius (R) of the tube (11).

* * * * *